United States Patent [19]

Casati et al.

[11] Patent Number: 4,473,666

[45] Date of Patent: Sep. 25, 1984

[54] CATALYST SYSTEM FOR USE IN PRODUCING CARBOXYLIC ACID BLOWN POLYURETHANE FOAMS

[75] Inventors: Francois M. Casati, Highland Park; Daniel S. Raden, Hawthorn Woods; Francis W. Arbir, Itasca, all of Ill.

[73] Assignee: Abbott Laboratories, North Chicago, Ill.

[21] Appl. No.: 575,247

[22] Filed: Jan. 30, 1984

[51] Int. Cl.$^3$ .............................................. C08G 18/14
[52] U.S. Cl. ...................................... 521/115; 502/167
[58] Field of Search ......................... 502/167; 521/115

[56] References Cited

U.S. PATENT DOCUMENTS 3,816,339  6/1974  Raden ................................. 502/167
4,379,757  4/1983  Baskent et al. ...................... 502/167

FOREIGN PATENT DOCUMENTS 2103228  2/1983  United Kingdom .

*Primary Examiner*—Maurice J. Welsh
*Attorney, Agent, or Firm*—Steven F. Weinstock; Martin L. Katz

[57] ABSTRACT

A catalyst system and process are provided for producing polyurethane foams using a carboxylic acid blowing agent, wherein an organic polyol and an organic polyisocyanate are contacted with a catalyst system comprising a dialkylcyclohexylamine and an N-substituted alkoxyalkyl piperazine.

21 Claims, No Drawings

CATALYST SYSTEM FOR USE IN PRODUCING CARBOXYLIC ACID BLOWN POLYURETHANE FOAMS

BACKGROUND OF THE INVENTION

The present invention relates to a catalyst system and process for producing carboxylic acid blown polyurethane foams.

Polyurethane foams typically are produced by the reaction of organic isocyanates with polyester or polyether polyols in the presence of a blowing agent. Although fluorocarbons have typically been used in the past as the preferred blowing agent, fluorocarbons are believed to have a negative environmental impact.

As a result, more environmentally compatible blowing agents have been sought. For example, polyurethane foams may be produced using blowing agents selected from carboxylic acids and salts of carboxylic acids in the presence of catalysts and promoters which include amine compounds such as dimethylbenzylamine, tetramethylethylenediamine and triethylenediamine.

Many of these catalysts, however, suffer from the disadvantage of being relatively toxic to humans. This toxicity increases the hazard of producing polyurethanes. Many of these catalysts also have the disadvantage of having unpleasant odors. These odors make polyurethane producing processes extremely unpleasant, and may result in a product with a residual odor which makes the product unacceptable for its intended use. Although nontoxic or nonodoriferous catalysts are known in the art, in many instances these catalysts fail to yield polyurethane foams with appropriate properties, i.e., the foam is tight and the reactivity is delayed, when used in carboxylic acid blown polyurethane systems.

SUMMARY OF THE INVENTION

It is therefore an object of the present invention to provide a catalyst system and process for producing polyurethane foams using carboxylic acid blowing agents wherein the catalyst system has diminished toxicity and may be used to produce a polyurethane foam which is substantially odor free.

These and other objects and advantages of the present invention may be accomplished by means of a catalyst system and a process wherein the catalyst system comprises a dialkylcyclohexylamine and an N-alkoxyalkyl substituted piperazine. This catalyst system preferably additionally includes an N-alkoxyalkyl morpholine.

DETAILED DESCRIPTION OF THE INVENTION

Polyurethane foams generally may be produced by reacting organic isocyanates with organic polyols in the presence of a blowing agent. In the catalyst system and the process of the present invention, one of the blowing agents is a carboxylic acid. This carboxylic acid may be added to or be present in the reaction system as either an acid or the corresponding salt derived by substitution of the acidic hydrogen with another substituent, such as an organic base like hydrazine, triethylamine, dimethylbenzylamine or triethylenediamine. While a variety of carboxylic acid derived blowing agents may be used in the catalyst system and process of the present invention, formic acid is preferred due to the fact that formic acid results in two moles of blowing gas being produced for each mole of formic acid used.

The polyols contain pendant hydroxyl groups which react with a polyisocyanate to produce a polyurethane. A variety of polyols are available commercially or may be produced by the reaction of an organic oxide and a compound containing two or more active hydrogens, such as glycols, water, acids or amines. Organic polyols particularly suitable for use in conjunction with the process and catalyst system of the present invention include polyether polyols and polyester polyols.

Organic isocyanates most widely used for preparation of polyurethanes are toluene diisocyanate (TDI), crude toluene diisocyanate and several types of polymeric isocyanates such as diphenylmethane-4,4'-diisocyanate, and polymethylenepolyphenyl isocyanate. The isocyanate most frequently used to produce a flexible polyurethane foam is an isomeric blend of distilled TDI containing 2,4-toluene diisocyanate and 2,6-toluene diisocyanate.

Organic polyols and organic isocyanates may be polymerized in the presence of a carboxylic acid blowing agent to form polyurethane foams by contacting the polyol and isocyanate with the catalyst system of the present invention, which comprises a dialkylcyclohexylamine and an N-alkoxyalkyl substituted piperazine.

The dialkylcyclohexylamine useful in the catalyst system and process of the present invention may be generally described by the formula

(I)

wherein R and R' are independently selected from the group consisting of $C_1$ to about $C_4$ alkyl groups.

The size and configuration of the alkyl groups R and R' may effect the basicity of the central nitrogen atom, with larger alkyl groups causing the nitrogen to be less basic. It is therefore preferred that the alkyl groups R and R' be independently selected from the group consisting of $C_1$ to about $C_3$ alkyl groups, and more preferably $C_2$ or $C_3$ alkyl groups. It is further preferred that at least one of R and R' be ethyl, with diethylcyclohexylamine being most preferred.

Further, the alkyl groups R and R' should be chosen so that the alkyl groups do not present substantial steric hindrance to the reactants, which may result in a long reaction time inconsistent with good foam formation. For this reason it is preferred that the alkyl groups be unbranched.

Examples of dialkylcyclohexylamine compounds consistent with the present invention include dimethylcyclohexylamine, diethylcyclohexylamine, methylethylcyclohexylamine, methylpropylhexylamine, dibutylcyclohexylamine and dipropylcyclohexylamine.

The N-alkoxyalkyl piperazine useful in the catalyst system and process of the present invention preferably is described by the formula:

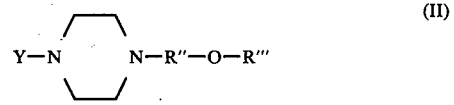
(II)

wherein Y is selected from the group consisting of hydrogen; alkyl groups having 1 to about 5 carbon atoms; and the moiety generally described by the formula $R^v$—O—$R^{iv}$; R" and $R^{iv}$ are independently selected from the group consisting of alkylene moieties having 1 to about 5 carbon atoms; and R'''and $R^v$ are independently selected from the group consisting of alkyl groups having 1 to about 3 carbon atoms.

The considerations relevant to the selection of alkyl groups in the dialkylcyclohexylamine are similar to those for selection of the substituents of the piperazine compound. Therefore, it is preferred that R" and $R^{iv}$, when applicable, have at least two and preferably four or less carbon atoms, such as in ethylene, propylene and butylene moieties. It is further preferred that R" and $R^{iv}$ be unbranched due to the increased steric hindrance resulting from branched alkylene groups. Similarly, it is preferred that R''' and $R^v$, when applicable, have 2 or less carbon atoms, such as methyl or ethyl, with methyl being most preferred.

Y may be hydrogen, such as in N-methyoxypropyl piperazine. In one embodiment of the present invention, however, the piperazine compound is an N'-alkyl substituted piperazine. When the piperazine is N'-alkyl substituted, the N'-alkyl group has 1 to about 5 carbon atoms and preferably is unbranched. Alkyl groups of 1 to about 5 carbon atoms are most preferred.

Examples of suitable piperazine compounds include N-methoxyethyl-N'-butyl piperazine, N-methoxyethyl-N'-pentyl piperazine, N-methoxypropyl-N'-methyl piperazine, N-methoxyethyl piperazine, N-ethoxypropyl piperazine, N-methoxypropyl piperazine, N-ethoxypentyl piperazine, N-propoxybutyl piperazine, N,N'-bis(methoxypropyl)piperazine, N,N'-bis(methoxypentyl)piperazine, N,N'-bis(propoxypropyl)piperazine, N-ethoxypropyl-N'-ethoxyethyl piperazine and N-methoxyethyl-N'-propoxypropyl piperazine.

In the preferred embodiment of the present invention the catalyst systems additionally include an N-alkoxyalkyl morpholine. This morpholine compound may be generally described by the formula:

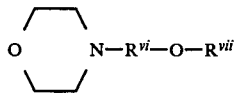

(III)

wherein $R^{vi}$ is an alkylene moiety having 1 to about 5 carbon atoms; and $R^{vii}$ is an alkyl group having 1 to about 3 carbon atoms.

It is further preferred that $R^{vi}$ be selected from ethyl, propyl, and n-butyl groups. It is also preferred that $R^{vi}$ be selected from the group consisting of methyl or ethyl. Due to the relatively small size of the methyl group, however, methoxy compounds, such as N-methoxy propylmorpholine, are most preferred.

Examples of morpholine compounds consistent with the invention include N-ethoxymethyl morpholine, N-methoxyethyl morpholine, N-methoxypropyl propylene, N-propoxypropyl morpholine, N-methoxybutyl morpholine, N-ethylbutyl morpholine and N-methoxypentyl morpholine.

It is preferred that the ratio by weight of the dialkylcyclohexylamine to the piperazine be about 1:0.5 to about 1:5. Ratios of about 1:1 to about 1:3 are more preferred.

When the catalyst system also includes an N-alkoxyalkyl morpholine compound, it is preferred that the ratio by weight of the dialkylcyclohexylamine to the morpholine be about 1:0.5 to 1:2. Ratios of about 1:1 to 2:3 are more preferred.

The appropriate proportion of the catalyst system to other components in the process of the present invention may be determined in relation to the polyol. This proportion is the amount of catalyst, by weight in grams, per one hundred grams of the polyol. This relationship is often termed "php" or parts per hundred polyol. Although not critical to the present invention, it is preferred that the catalyst system be present in amounts of about 0.1 to 4 php. Amounts of about 0.5 to 2 php are more preferred.

The proportion of organic isocyanate to organic polyol will depend on many factors, such as the type of polyurethane product desired, the type of isocyanate and the type of polyol. In most polyurethane foams, however, the ratio of isocyanate to polyol, by weight, will be about 0.25:1 to 1:1.

The amount of carboxylic acid useful in the process of the present invention will depend on many factors, including the identity of the carboxylic acid, since less blowing agent may be used when the carboxylic acid yields more than 1 mole of blowing gas per mole of carboxylic acid. It is preferred, however, that the amount of carboxylic acid, by weight, be present in amounts equal to about 0.5 to 5 php.

The temperature and pressure at which the isocyanate and organic polyol are contacted with the catalyst system are not critical to the present invention. Due to the economic advantage inherent in performing the reaction at ambient temperatures and pressures, ambient temperatures are preferred.

SPECIFIC EMBODIMENTS

Comparative experiments and experiments embodying aspects of the present invention were conducted. Unless otherwise noted, those experiments were conducting using the formulation and procedure outlined below. Unless otherwise noted, portions in the formulation are parts by weight.

Formulations (A–C) for these experiments, based on weight per hundred parts of polyol, are given in Table I. Formulation A is a conventional formulation blown with water and fluorocarbon 11 and was used in experiments with results shown in Table III. Formulations B and C are blown with formic acid and were used in experiments with results shown in Tables IV, and V, VI, respectively. Each Formulation B and C included different amounts of formic acid in an effort to adjust the density of the resulting foam. All formulations were based on 100 grams of polyol with the exception of the formulation (Formulation C) with proportionately reduced component amounts utilized in the experiments shown in Table VI, which were based on 80 grams of polyol, enabling the foam to be lowered for convenience purposes. Likewise, all formulations included 0.70 grams of 50% stannous octoate (sold under the registered trademark T10 by M & T Chemical Inc., Rahway, N.J. except in those experiments shown in Table V in which the amount of T10 was varied as indicated.

The reaction components of these formulations were fed to a mixing chamber in 3 streams, namely polyol, isocyanate and activator streams, with the activator stream including a surfactant, water, catalyst, co-catalyst and blowing agent. The container with the resulting mixture was placed at the bottom of a foaming column and foam was allowed to rise without constraint.

The foaming column was adapted to give a computerized readout of reaction parameters. These parameters included the time elapsed before significant polyol/TDI reaction was initiated ($T_I$), the total time it took for the foam to expand to its maximum height ($T_R$), and the foaming time ($T_F$) which is the difference between $T_I$ and $T_R$. These and other symbols and definitions are summarized in Table II.

The catalyst systems of this invention are best illustrated by reference to the following examples which, however, are not intended to limit the invention in any respect.

EXAMPLE 1-2

Experiments were conducted with conventional formulations (Formulation A) which are currently used on industrial lines and catalyzed with conventional amines. The results of these experiments are shown in Table III. These experiments produced conventionally acceptable foam.

EXAMPLES 3-4

Experiments were conducted with the same amine catalysts as in Examples 1-2, but with a formulation using formic acid as a blowing agent (Formulation B). The results are shown in Table IV and disclose that the initiation time is significantly delayed. The resulting foams were tight, i.e., had partially closed cellular structure.

EXAMPLE 5

An experiment was conducted with Formulation B which utilizes formic acid as a blowing agent and benzyldimethylamine, which is known to be useful in carboxylic acid blown polyurethane systems. The results are shown in Table IV. Although this catalyst may have acceptable activity (i.e., initiation time), the benzyldimethylamine has a pronounced odor and significant toxicity. Additionally, the resulting foam has a particially closed cellular structure, but better than foams produced in Examples 3-4.

EXAMPLE 6

This experiment was conducted to demonstrate the performance of the catalyst, diethylcyclohexylamine in a polyurethane system using formic acid as a blowing agent (Formulation B). The result of the experiment are shown in Table IV. The experiment produced foam having low residual odor, but did not have a sufficiently open cellular structure.

EXAMPLE 7-8

Examples 5-6 were repeated but with lower amounts of formic acid, i.e., formulation C was used to provide a basis for comparing embodiments of the present invention with catalyst systems known in the art. The results of this experiment are shown in Table V. Both experiments demonstrated acceptable initiation time and produced tight foam. Additionally, the foam produced in experiment 7 again had an unacceptable residual odor.

EXAMPLE 9

An experiment was conducted using N-alkoxyalkyl piperazine, namely N-methoxypropyl-N'-methyl piperazine, and N-alkoxyalkyl morpholine, namely N-methoxypropyl morpholine, to catalyze a formic acid blown polyurethane system (Formulation C) without a dialkylcyclohexylamine The results of this experiment are indicated in Table V. This catalyst system created no odor but resulted in a long reaction time, making this catalyst system unsuitable for many applications.

EXAMPLE 10

Experiments were conducted to demonstrate the preferred embodiment of the present invention wherein the catalyst system comprises a dialkylcyclohexylamine, namely diethylcyclohexylamine, an N-substituted alkoxyalkyl piperazine, namely N-methoxypropyl-N'-methyl piperazine, and an N-alkoxyalkyl morpholine, namely N-methoxypropyl morpholine. Formulation C was utilized. The results of these experiments are indicated in Table V. As these examples show, the initiation time may be significantly shortened by the presence of a dialkyl-cyclohexylamine in the catalyst system. The resulting foam was acceptable.

EXAMPLES 11-12

Examples 7 and 8 were repeated, but with lower amounts of T10. The results of this experiment are shown in Table V and confirmed previous results.

EXAMPLE 13

An experiment was conducted to demonstrate the performance of dimethylcyclohexylamine in polyurethane systems using formic acid as a blowing agent (Formulation C). The results of this experiment are indicated in Table V. Although the reaction proceeded quickly, the resulting foam was tight and had a residual odor.

EXAMPLE 14

An experiment identical to Example 7, but for the reduced amount of polyol (80 g.) and corresponding reduced amounts of all other components, was conducted using benzyldimethylamine, a known catalyst for formic acid blown polyurethane foams. This experiment served as a basis for comparing the embodiments of the present invention with other known catalyst systems. The results of this experiment are indicated in Table VI and confirm previous results. Again, the foam produced in this experiment has an unacceptable residual odor.

EXAMPLE 15

An experiment was conducted to demonstrate the embodiment of the present invention wherein the catalyst system of the present invention comprises diethylcyclohexylamine and an N-alkoxyalkyl substituted piperazine, namely N-methoxypropyl-N'-methyl piperazine. Formulation C with proportionately reduced amounts of components was used. The results of these experiments are indicated in Table VI. These results demonstrate diethylcyclohexylamine with N-alkoxyalkyl piperazine produces a tight foam, but with low residual odor.

EXAMPLE 16

An experiment was conducted to demonstrate the preferred embodiment of the present invention wherein the catalyst system comprises a dialkylcyclohexylamine, an N-alkoxyalkyl morpholine and an N-alkoxyalkyl substituted piperzine. In particular, diethylcyclohexylamine, N-methoxypropyl-N'-methyl piperzine and N-methoxypropyl morpholine were used. The components used here were identical to Example 10 but the amounts were proportionately reduced as explained above. The results of the experiment are indicated in Table VI. This experiment produced a foam having improved foam characteristics relative to Example 15 and no odor.

It will be understood that various changes and modifications may be made in the above described catalyst system and process without departing from the spirit of the invention, as particularly defined in the following claims.

TABLE I

|  | Formulations | | |
| --- | --- | --- | --- |
|  | A | B | C |
| Polyol (Polyether) | 100 | 100 | 100 |
| Silicone surfactant | 1.50 | 1.50 | 1.50 |
| Water | 3.50 | 3.50 | 3.50 |
| Fluorocarbon 11 | 18.0 | 0 | 0 |
| Formic Acid (100%) | 0 | 2.9 | 2.7 |
| Stannous Octoate (50%) | 0.70 | 0.70 | Vary |
| Toluene diisocyanate (TDI) | 46.7 | 58.7 | 58.70 |
| Amine | Vary | Vary | Vary |

TABLE II

| Symbol | Definition |
| --- | --- |
| T10 | Amt. of 50% Stannous Octoate (T10 is a registered trademark of M & T Chemical, Inc., Rahway, New Jersey) |
| X | Rise Height |
| $T_I$ | Initiation Time (Sec.) |
| $T_R$ | Rise Time |
| $T_F$ | Foaming Time ($T_R - T_I$) |
| BDMA | Benzyldimethylamine |
| DECHA | Diethylcyclohexylamine |
| DMCHA | Dimethylcyclohexylamine |
| DMEA | Dimethyl Ethanolamine |
| NMPM | N—methoxypropyl morpholine |
| NMPNMP | N—methoxypropyl-N'—methyl piperazine |
| PMDPT | Pentamethyl Dipropyltriamine |
| TMHPD | Trimethyl N (2-hydroxyethyl)-propanediamine |

TABLE III

| | | (Formulation A) | | | |
| --- | --- | --- | --- | --- | --- |
| Example | Catalyst | php | X | $T_I$ | $T_R$ | $T_F$ |
| 1 | DMEA | 0.13 | 19.97 | 30 | 111 | 81 |
|  | PMDPT | 0.27 | | | | |
| 2 | DMEA | 0.13 | | | | |
|  | TMHPD | 0.27 | 19.33 | 34 | 126 | 92 |

TABLE IV

| | | (Formulation B) | | | | |
| --- | --- | --- | --- | --- | --- | --- |
| Example | Catalyst | php | X | $T_I$ | $T_R$ | $T_F$ |
| 3 | DMEA | 0.13 | 19.25 | 47 | 109 | 62 |
|  | PMPDT | 0.27 | | | | |
| 4 | DMEA | 0.13 | 19.97 | 51 | 120 | 69 |
|  | TMHPD | 0.27 | | | | |
| 5 | BDMA | 0.50 | 19.97 | 27 | 85 | 58 |
| 6 | DECHA | 0.60 | 19.15 | 29 | 89 | 60 |

TABLE V

| | | (Formulation C) | | | | | |
| --- | --- | --- | --- | --- | --- | --- | --- |
| Example | Catalyst | php | T10 | X | $T_I$ | $T_R$ | $T_F$ |
| 7 | BDMA | 0.5 | 0.70 | 19.97 | 30 | 106 | 76 |
| 8 | DECHA | 0.6 | 0.70 | 19.97 | 33 | 109 | 76 |
| 9 | NMPMMP | 0.40 | 0.70 | 19.56 | 47 | 133 | 86 |

TABLE V-continued

| | | (Formulation C) | | | | | |
| --- | --- | --- | --- | --- | --- | --- | --- |
| Example | Catalyst | php | T10 | X | $T_I$ | $T_R$ | $T_F$ |
| 10 | NMPM | 0.10 | | | | | |
|  | DECHA | 0.15 | | | | | |
|  | NMPMP | 0.40 | 0.70 | 19.97 | 39 | 110 | 71 |
| 11 | NMPM | 0.10 | | | | | |
|  | BDMA | 0.50 | 0.50 | 19.97 | 31 | 112 | 81 |
| 12 | DECHA | 0.60 | 0.50 | 19.31 | 32 | 107 | 75 |
| 13 | DMCHA | 0.50 | 0.50 | 19.97 | 23 | 70 | 48 |

TABLE VI

| | | (Formulation C) | | | | | |
| --- | --- | --- | --- | --- | --- | --- | --- |
| Example | Catalyst | php | T10 | X | $T_I$ | $T_R$ | $T_F$ |
| 14 | BDMA | 0.50 | 0.70 | 15.74 | 27 | 88 | 61 |
| 15 | DECHA | 0.40 | 0.70 | 15.56 | 29 | 75 | 46 |
|  | NMPMMP | 0.40 | | | | | |
| 16 | DECHA | 0.20 | | | | | |
|  | NMPMMP | 0.45 | 0.70 | 15.26 | 32 | 80 | 48 |
|  | NMPM | 0.15 | | | | | |

What is claimed is:

1. A catalyst system for use in reacting an organic isocyanate with an organic polyol in the presence of a carboxylic acid blowing agent, wherein the catalyst system comprises a dialkylcyclohexylamine and an N-substituted alkoxyalkyl piperazine.

2. The catalyst system of claim 1 wherein the dialkylcyclohexylamine is generally described by the formula:

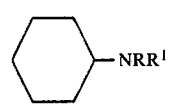

(I)

wherein R and R' are independently selected from the group consisting of $C_1$ to about $C_4$ alkyl groups.

3. The catalyst system of claim 2 wherein R and R' are independently selected from the group consisting of $C_1$ to about $C_3$ alkyl groups.

4. The catalyst system of claim 1 wherein the N-alkoxyalkyl piperazine is generally described by the formula:

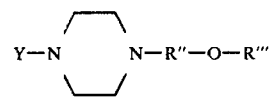

(II)

wherein Y is selected from the group consisting of hydrogen, alkyl groups having 1 to about 5 carbon atoms, and the moiety generally described by the formula $R^v$—O—$R^{iv}$; $R''$ and $R^{iv}$ are independently selected from the group consisting of alkylene moieties having 1 to about 5 carbon atoms; and $R'''$ and $R^v$ are independently selected from the group consisting of alkyl groups having 1 to about 3 carbon atoms.

5. The catalyst system of claim 4 wherein $R''$ and $R^{iv}$ are independently selected from the group consisting of $C_2$ to $C_4$ alkylene moieties.

6. The catalyst system of claim 4 wherein $R'''$ and $R^v$ are independently selected from the group consisting of methyl and ethyl groups.

7. The catalyst system of claim 4 wherein Y is an alkyl group having 1 to about 3 carbon atoms.

8. The catalyst system of claim 1 wherein the catalyst system additionally comprises an N-alkoxyalkyl morpholine.

9. The catalyst system of claim 8 wherein the N-alkoxyalkyl morpholine is generally described by the formula:

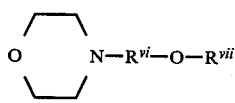 (III)

wherein $R^{vi}$ is an alkyl moiety having 1 to about 5 carbon atoms; and $R^{vii}$ is an alkyl group with 1 to about 3 carbon atoms.

10. The catalyst system of claim 9 wherein $R^{vi}$ is an alkylene moiety having 2 to 4 carbon atoms.

11. The catalyst system of claim 9 wherein $R^{vii}$ is selected from methyl or ethyl.

12. The catalyst system of claim 1 wherein the dialkylcyclohexylamine is diethylcyclohexylamine.

13. The catalyst system of claim 1 wherein the piperazine is N-methoxypropyl piperazine.

14. The catalyst system of claim 1 wherein the ratio of the dialkylcyclohexylamine to the piperazine is about 1:0.5 to 1:5.

15. The catalyst system of claim 8 wherein the morpholine is N-methoxypropyl morpholine.

16. The catalyst of claim 8 wherein the ratio of the dialkylcyclohexylamine to the morpholine is about 1:0.5 to 1:2.

17. A process for producing a polyurethane foam from an organic isocyanate and an organic polyol in the presence of a carboxylic acid blowing agent by contacting the isocyanate and the polyol with a catalyst system comprising a dialkylcyclohexylamine and an N-alkoxyalkyl piperazine.

18. The process of claim 17 wherein the ratio of dialkylcyclohexylamine to piperazine is about 1:0.05 to 1:5.

19. The process of claim 17 wherein the catalyst system additionally comprises an N-alkoxyalkyl morpholine.

20. The process of claim 19 wherein the ratio of dialkylcyclohexylamine to morpholine is about 1:0.5 to 1:2.

21. The process of claim 17 wherein the catalyst system is present in an amount equal to about 0.1 to 4 php.

* * * * *